United States Patent [19]

Menendez et al.

[11] 3,985,857

[45] Oct. 12, 1976

[54] PROCESS FOR RECOVERING ZINC FROM FERRITES

[75] Inventors: Francisco Javier Sitges Menendez; Vicente Arregui Fernandez, both of Salinas, Spain

[73] Assignee: Asturiana de Zinc, S.A., San Juan de Nieva, Castrillon, Spain

[22] Filed: Aug. 9, 1973

[21] Appl. No.: 387,191

[30] Foreign Application Priority Data

Oct. 20, 1972 Spain .................................. 407811

[52] U.S. Cl. ............................. 423/106; 75/115; 75/120; 204/114; 423/36; 423/109
[51] Int. Cl.² ......................................... C22B 19/22
[58] Field of Search ............... 423/36, 140, 549, 99, 423/101, 106, 109, 544, 558, 633, 551; 75/115, 118, 120; 204/114

[56] References Cited
UNITED STATES PATENTS

| | | |
|---|---|---|
| 1,973,295 | 9/1934 | Myhren.............................. 423/106 |
| 3,434,798 | 3/1969 | Menendez et al. .................. 75/115 |
| 3,482,966 | 12/1969 | Orlandini et al..................... 75/115 |
| 3,798,304 | 3/1974 | Weston................................ 423/36 |

Primary Examiner—Oscar R. Vertiz
Assistant Examiner—Gary P. Straub
Attorney, Agent, or Firm—Christen & Sabol

[57] ABSTRACT

The improvement in the process for recovering zinc from ferrites which includes treating electrolytic zinc plants residues with a sulfuric acid solution to dissolve the zinc and metals, a solution resulting which contains sulphates of zinc and the other dissolved metals. The undissolved residue is separated in a certain manner from the solution. The solids-free solution is neutralized in a second step with calcine or another neutralizing agent containing zinc until a certain acidity is reached so that the iron remaining in solution separates therefrom in the form of its complex basic sulfate. The solids are settled out and then sent to a neutralization step, which is part of the residue separation scheme, where they are used as seeds of crystals of complex basic sulfate of iron which helps to remove iron in the first neutralization step. This final solution is added to the normal circuit or process flow path of electrolytic zinc plants. Any $Fe^{++}$ existing or forming during the process is oxidized by $MnO_2$.

4 Claims, 2 Drawing Figures

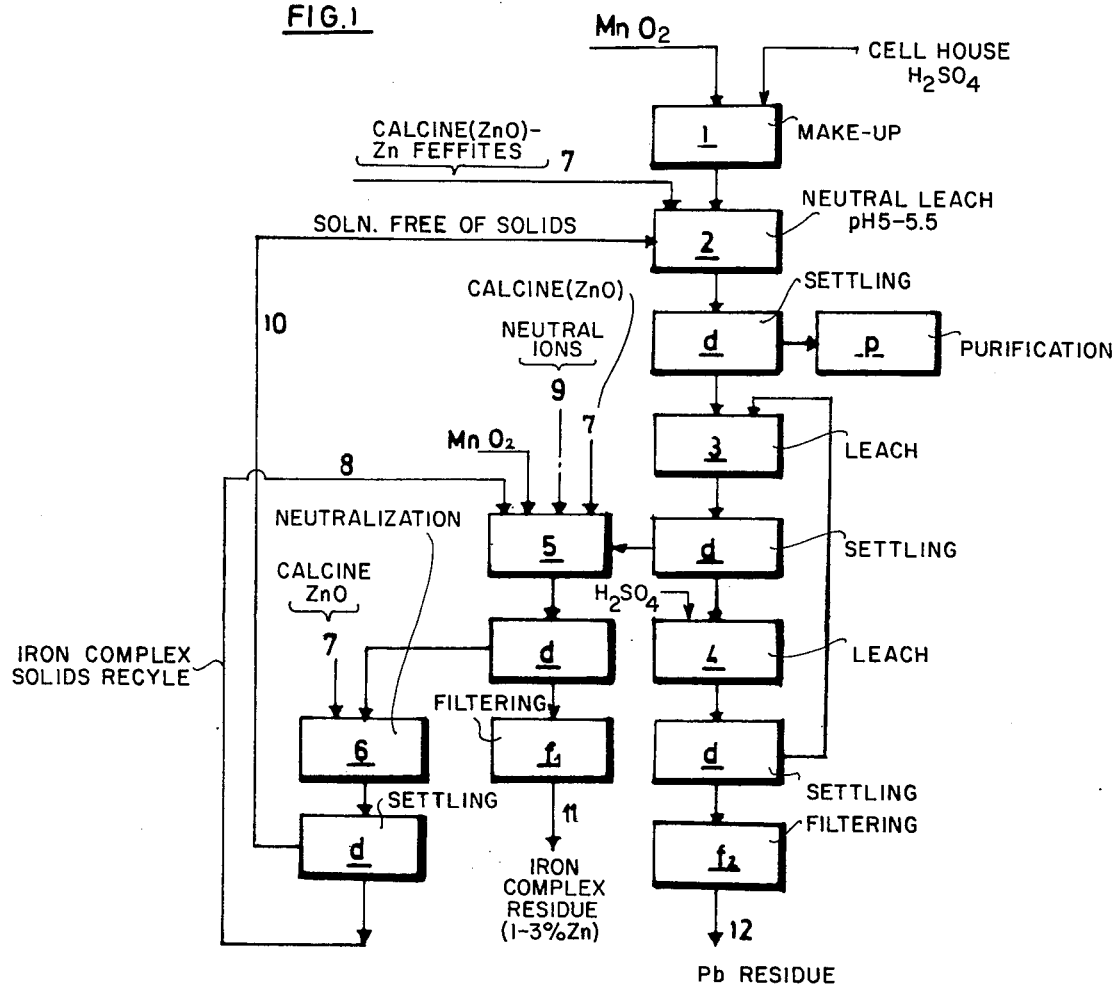

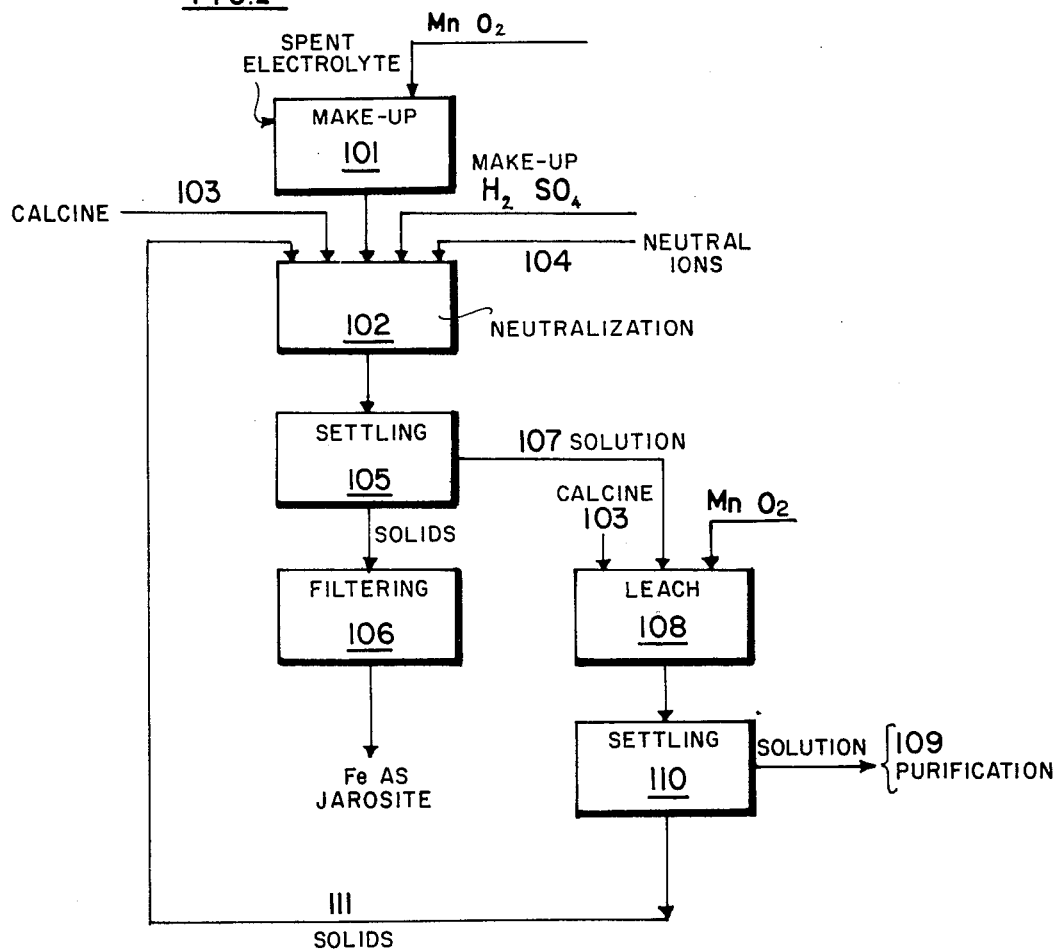

PROCESS FOR RECOVERING ZINC FROM FERRITES

BACKGROUND OF THIS INVENTION

1. Field of this Invention

This invention relates to an improved process for the recovery of zinc contained in the ferrites produced by roasting zinc concentrates and/or complex concentrates containing zinc.

2. Prior Art

It is known that zinc values may be obtained from zinc sulphide concentrates by roasting the concentrates to produce a calcine comprising zinc oxide, dissolving the oxide in aqueous sulphuric acid to provide a zinc sulphate solution which is subsequently electrolized to yield the desired zinc value. The oxygen which is free during the electrolysis regenerates sulphuric acid which may be recycled to dissolve additional zinc oxide. This return acid is commmonly called "spent electrolyte" or "return acid".

During the roasting of zinc sulphide concentrates, a portion of zinc, as well as other heavier metal constituents, such as copper, cadmium and lead, combine with a portion of the iron contents thereof to form "ferrite" compounds which, generally speaking, are believed to correspond to the formula $MeO.Fe_2O_3$, in which Me may be any of the above-named metals.

Zinc ferrites, $ZnO.Fe_2O_3$, are insoluble in the aqueous solution of sulphuric acid used in the leaching of zinc oxide under conditions normally existing in the leaching operations of electrolytic zinc recovery processes. The higher the iron contents in the zinc ore concentrate, the greater the amount of zinc converted into the insoluble form during roasting. Consequently, a residue is obtained from the leaching stage which has a zinc content of about 18 to 20 percent, the larger portion of which is in the form of zinc ferrite, and the remainder comprising unroasted zinc sulphide. Zinc ferrites are accompanied by copper and cadmium ferrites, both of which have not been solubilized during the leaching stages.

Various processes have been suggested for treatment of these residues. All of them can be reduced to two processes: the separation of iron as $FeO(OH)$, or goethite, and the separation of iron as complex basic sulphate (jarosite type) $Me_2Fe_6(SO_4)_4(OH)_{12}$, in which Me can be $Na^+$, $K^+$, $NH_4^+$, $Li^+$, or $H_3O^+$. Consideration will only be given herein to processes for iron separation as jarosite.

It is known that present-day technology on this process for separating Fe as complex basic sulphate is to some extent conditioned to the composition of the original zinc concentrate. The presence of significant quantities of lead and silver in zinc concentrates determines the practical flow-sheet to be followed in a given plant.

As is already known, the final residue resulting from the decomposition of zinc ferrites is a product which virtually contains all the lead and silver present in the original zinc concentrate. Consequently, it is of interest that in some plants a flow-sheet is followed in order to permit the isolated recovery of this very interesting product, interesting from the economical point of view.

On the other hand, up to now, both in the relevant specifications of patents and in the literature on iron precipitation from solutions resulting from the dissolution of zinc ferrites and other metals present in residues of zinc electrolytic plants as complex basic sulphates of the jarosite type takes place in a slightly acid solution with a pH of about 1.5, as can be gathered, e.g., from Spanish Patent Specification No. 304,601, Norwegian Patent Specification No. 108,047 and Australian Patent Application No. 57013/65.

Under these conditions, it is probable to encounter settling and filtering problems, due to the risk of forming varying amounts of $Fe(OH)_3$ together with the jarosite precipitate, as well as problems encountered due to the silica contents of these solids, when operating at an industrial scale with weak acid solutions containing high iron concentrations, On the other hand, the amount of calcine used to gradually reduce the acidity of the solution resulting from dissolution of the ferrites down to a pH of about 1.5, represents a very considerable percentage of the total calcine involved, such calcine amount being used in acidity conditions in which the ferrites are not dissolved; consequently, the zinc percentage contained in the residue increases considerably, which results in a simultaneous drop in total zinc recovery.

The problem of zinc contents waste in final plant residue becomes really serious and deserves particular attention in plants where the zinc concentrates processed do not contain high enough lead and silver values as to make it worthwhile to set up a recovery stage for these two metals in the manufacturing process, or even that in spite of lead and silver being present in significant quantities to be of interest, they do not have a recovery stage in order to keep down equipment investment, and, therefore, lead, silver and iron separation is carried out in a single stage (frequency batchwise), finalizing the leaching operation at a pH of 5 to 5.5, as disclosed, e.g., in German Patent Specification No. 1,948,411–8.

Plants operating this way usually eliminate most of the iron as complex basic sulphate, leaving at the end a small quantity of iron which is eliminated as $Fe(OH)_3$ so that impurities, such as As, Sb, Ge, etc., are removed from the solution, which, after being previously settled and freed from solids, is sent to the next purification step.

Zinc contents in residues of plants using this process usually range between 10 and 15 percent, and total recovery, for a 10 percent Fe contents in zinc concentrate, does not usually exceed 90%.

Applicants' novel process, the subject matter of this application, advantageously obviates these problems and leads to very satisfactory results which are, in any case, far better than any results previously achieved.

Our prior U.S. Pat. No. 3,434,798 (based on a Spanish application which matured into Spanish Patent No. 304,601) provides a process for resolving zinc from zinc ferrite. Basically, the process is conducted at atmospheric pressuure and at a temperature within the range 90° to 95° C. which comprises:

1. Treating said residue with a sulfuric acid solution having an initial concentration of not less than 300 g./l. of $H_2SO_4$ thereby dissolving said residue to obtain a resulting solution containing zinc sulphate and iron sulphate, said resulting solution having a sulfuric acid concentration of 180 to 200 g./l., 2. Separating undissolved residue containing said heavier metals from said solution, 3. Adding a diluent to said solution so as to obtain a more dilute solution based on the content of said iron sulphate, 4. Neutralizing said solution to an acidity of about 3 to 5 g./l. of $H_2SO_4$, so as to form a granular basic iron sulphate precipitate and a zinc sulphate solution, and 5. Separating said basic iron sulphate precipitate from said zinc sulphate solution.

According to U.S. Pat. No. 3,434,798, the solution resulting from the attack on the residues is neutralized either with sintered blends or zinc calcine to an acidity of 3 to 5 gr/liter of sulfuric acid at a temperature of 90° to 95° C.

With these conditions of acidity and temperature, a high percentage of the copper dissolved during the attack of residues and later neutralization, remains in solution. Normally, this acid solution is sent in all electrolytic zinc plants which have adopted this process, to the neutral leaching stage, where the copper is again precipitated in a variable, but normally high, percentage, with basic salts.

Even when these neutral residues are again attacked by a hot, strongly acidic leaching and the copper is dissolved once more, there is a blackening of the system from copper, which is reflected by a greater loss of this metal accompanying the residue of base iron sulfate.

The use of metal zinc to bind this copper in acid solution is very dangerous, since solutions are involved which at the same time usually contain variable amounts of arsenic and antimony with the consequent danger of imminent release of $AsH_3$ and $SbH_2$.

In our first Certificate of Addition (to Spanish Patent No. 304,601) entitled: "Improvements in or relating to the subject matter of U.S. Pat. No. 304,601", dated 9th July 1966, a complete definition of the term "complex concentrate" is given. Also, therein is described the use of sodium, potassium and ammonium ions, these considered both individually and combined, for iron removal from solutions as complex basic sulphate.

In our second Certificate of Addition (to Spanish Patent No. 304,601), dated 14th November 1970, a process is disclosed for dissolving ferrites in two or more countercurrent stages.

Attention is drawn to Spanish Patent No. 304,601, granted Oct. 15, 1964. Attention is also drawn to U.S. Pat. Nos. 1,069,178, 1,973,295 and 3,482,966.

BROAD DESCRIPTION OF THIS INVENTION

This invention involves an improvement in the process for recovering zinc from ferrites. This process involves treating the residues of electrolytic zinc plants in at least one stage with a sulphuric acid solution to dissolve the zinc and metals contained in the residues. A resulting solution which contains zinc sulphate and sulphates of the other dissolved metals is obtained. The undissolved residue is separated from the solution, the separation being characterized in that the resulting solution, after the addition of $Na^+$, $K^+$ or $NH_4^+$ ions, is neutralized in a first step with zinc oxide, which is termed calcine, or other appropriate zinc-containing agent until its acidity is 10 to 100 gm./l. of $H_2SO_4$, so that some of the iron contained in the solution therefrom in the form of a complex basic sulphate. The solids are settled before being separated by filtering. The solids-free solution is neutralized in a second step with calcine or another neutralizing agent containing zinc until its acidity is 2 to 10 gm./l. of $H_2SO_4$, so that the iron remaining in solution separates therefrom in the form of its complex basic sulphate. The solids are settled and then sent to the first neutralization step where they are used as seeds of crystals of complex basic sulphate of Fe, which helps to removed iron in the first step to give a final solution with an Fe content of 1 to 3 gm./l. The last mentioned solution is added to the normal circuit or process flow-path of electrolytic zinc plants. A temperature of 50° C. to the boiling point of the solution is maintained throughout the process. Any $Fe^{++}$ existing or forming during the process is oxidized by $MnO_2$ or some other appropriate agent. The solids of the second step or stage can be eliminated from the process by being sent directly to filtration. The solids from the second stage can be sent to the first step of the hot acid leach.

The process can involve the situation wherein the zinc oxide and ferrites contained in the calcine are dissolved in a first step with return acid, which can be reinforced, if necessary, with concentrated $H_2SO_4$, at a temperature of 50° C. to the boiling point of the solution, until an acidity of 100 to 100 gm./l. of $H_2SO_4$ is reached, in the presence of $Na^+$, $K^+$ or $NH_4^+$ ions, any $Fe^{++}$ existing in the solution being oxidized by $MnO_2$ or some other appropriate oxidant; some of the iron is then precipitated in its complex basic sulphate form; the solids separated from this step by settling and, after filtering, form the residue of Fe, Pb and Ag; the solids-free solution is sent to a second step or stage where it is gradually neutralized with calcine until its pH is 5 to 5.5, at a temperature of 50° C. to the boiling point of the solution, in the presence of $Na^+$, $K^+$ or $NH_4^+$ ions, any $Fe^{++}$ present being oxidized with $MnO_2$ or some other appropriate oxidant, so that some of the Fe is precipitated as complex basic sulphate and the remainder is precipitated as $Fe(OH)_3$, the latter for purifying the resulting solution to make it suitable for being sent to the next stage of purification with zinc dust; the solids resulting from this step are separated by settling and sent for treatment in the first stage to dissolve the zinc oxide and the zinc ferrites and the copper and cadmium ferrites present in the last-mentioned solids, while the precipitate of complex basic sulphate remains unchanged and serves for crystal seeding to make easier the separation of the iron present in the solution being sent to the zinc dust purification stage or step.

DETAILED DESCRIPTION OF THE INVENTION

This process is based, as indicated above, on the elimination of iron as a complex basic sulphate by previous oxidation with $MnO_2$, air, or other suitable oxidant of the $Fe^{++}$ that can exist in the solution, at a temperature ranging from 50° C. to the boiling point of the solution, with an acidity which varies within the very wide limits of 10 to 100 gm./l. of $H_2SO_4$ and in the presence of the aforementioned ions (i.e., $Na^+$, $K^+$, $NH_4^+$, $Li^+$ or $H_3O^+$).

Two specific embodiments of the process are treated below, one (preferred) for a plant making full use of the jarosite process and one for a plant using the jarosite process in a simplified way — e.g., either in batch or continuous operation but with a separation of lead, silver and iron in a single step. Naturally, many other embodiments are possible within the scope of this invention.

In the drawings:

FIG. 1 is a flow-sheet of the preferred embodiment of this invention, and

FIG. 2 is a flow-sheet of another embodiment of this invention.

As it can be gathered from FIG. 1, a precipitation of iron as complex basic sulphate is added, in two stages 5 and 6, to the conventional stages of head acid 1, neutral leaching 2 and two-stage countercurrent hot acid leaching 3 and 4. Head acid 1 is an admixture of cell house $H_2SO_4$ and $MnO_2$. Leach 3 involves treating the residue from item 1 with a solution having an $H_2SO_4$ concentration of about 180 to 200 g./l. The solution is decanted to separate the undissolved residue, the resulting solution having an $H_2SO_4$ concentrate of greater than 10 g./l. Leach 4 involves treating the residue from item 4 with a solution having an $H_2SO_4$ concentration of at least 300 g./l. to obtain a resulting solution containing zinc sulphate and iron sulphate. The resulting solution has a sulfuric acid concentration of 180 to 200 g./l. In stage 5, the solution resulting from the first hot acid leaching of the residues, resulting from neutral leaching with an acidity of 40 to 150 gm./l. of $H_2SO_4$ and an Fe concentration of 10 to 50 gm./l., is neutralized with zinc calcine 7 and solids from the second Fe precipitation stage 8 down to an acidity of 10 to 100 gm./l. of $H_2SO_4$, so that the Fe in solution, in the presence of neutral ions 9, and after previous oxidation, is separated, at a temperature of 50° to 100° C., from the solution as complex basic sulphate, which can readily be settled, washed and filtered, and which has a zinc contents of 1 to 3 percent, this number depending on the acidity in which the precipitation is performed. The neutral ions can be $Li^+$, $H_3O^+$, $NH_4^+$, $Na^+$ or $K^+$ ions — they allow the iron to precipitate as jarosite or the solid iron sulfate complex residue. The solution resulting from the first stage 5, previously settled, is subjected to a second stage 6 where neutralization with zinc calcine 7 is continued up to an acidity of 2 to 10 gm./l. of $H_2SO_4$ and, as a result, the iron present in the solution entering this stage decreases to 1 to 2 gm./l. The previously settled solid 8 is sent to first stage 5 where existent zinc ferrites will be virtually dissolved in view of the high acidity level present, while the complex basic sulphate will remain unchanged, thereby serving as crystalization seeds which makes iron separation easier in this stage.

The settled liquid is sent to neutral leaching 2 to start the process.

In FIG. 1, settling stages are represented by the letter $d$; the purification stage is represented by $p$; jarosite-filtering is indicated as $f$; a Pb-Ag filtering stage as $f2$; in 11 a residue of jarosite is obtained; and in 12 a Pb—Ag residue is obtained.

In FIG. 2, the process of this invention is applied in a more simplified manner. Spent electrolyte (placed into make-up vessel 101) emerging from the zinc electrolysis cells, having an acidity of 150 to 200 gm./l. of $H_2SO_4$, reacts with calcine 103 in a tank 102 until its acidity decreases to 10 to 100 gm./l. of $H_2SO_4$. The solution is heated up to 90° to 95° C. and $MnO_2$ added to oxidize the $Fe^{++}$ that exists in solution. Likewise, neutral ions 104 (e.g., sodium, potassium and ammonium ions) are added to make iron separation as complex basic sulphate easier, as well as concentrated acid which compensates for the ion sulphate lost due to the Fe residue.

Under these conditions, the dissolutions of zinc ferrites and, of course, the zinc oxide of the calcine are virtually total, while iron precipitates as jarosite. Settling 105, filtering 106 and washing are performed under excellent conditions and zinc contents in this residue is very low (Zn: 1 to 5 percent). The settled solution 107, with an acidity of 10 to 100 gm./l. of $H_2SO_4$, is sent to a second stage 108 to be gradually neutralized with calcine 103 up to a pH of 5 to 5.5. $MnO_2$ is also added to second leach step 108.

The Fe contained in this solution is mostly separated as jarosite, while the rest is separated as $Fe(OH)_3$, as a result of the pH of 5 to 5.5 which is reached at the end. Under these conditions, the solution previously settled 110 becomes free not only from Fe but also from the rest of the impurities (As, Sb, Ge, etc.) and, therefore, suitable to be sent to the subsequent purification stage 109 with zinc dust.

The solids settled 111 in this second attack stage 108 are sent to the first stage 102 where zinc ferrites are dissolved to a great extent due to existent conditions of acidity and temperature, while the iron precipitated as jarosite becomes unalterable, thereby serving again as a base for the formulation of new jarosite crystals.

The second stage is performed under temperature and oxidizing conditions similar to those of the first stage.

As it can be appreciated in spite of the simplicity of the process of FIG. 2, greater recoveries of zinc and other metals (Cu, Cd) which are contained in the concentrates of zinc are obtained, recoveries which are very similar to those obtained by the process of FIG. 1. The disadvantage of the process of FIG. 2 with regard to the process of FIG. 1 is the fact that Pb/Ag residue remains in the jarosite residue.

The nature of the invention and the manner in which the same may be carried into effect now having been sufficiently described, it is declared that the features hereinbefore set forth may vary in detail provided that no variation is entailed thereby in the fundamental principle of this invention.

The process of applicants' copending U.S. Patent application Ser. No. 261,717 abandoned in favor of U.S. Patent application Ser. No. 466,496 filed May 2, 1975 is based on the fact that the precipitation of the complex basic sulphate (jarosite) takes place in a solution with higher acidity than has previously been the case, whereby the percentage of dissolved zinc as well as of other metals contained in the aforementioned concentrates, increases considerably, giving, at the same time, an industrial practice which is far easier than any other process currently in use. In this process, the zinc residue is pretreated with a weak acid solution prior to treatment with the concentrated acid solution.

Consequently, the leaching of the residues of the zinc plants is performed in at least two stages, by attacking the residues in a first stage with an acid with a slight concentration, sufficient so that at the end of this stage the concentration thereof is not less than 5 g./l. The residue of this first stage are attacked in a final stage with acid whose concentration is approximately 300 g./l. This process can also be performed in more than two stages, by attacking with a weak acid in the first and intermediate stages. The weak acid used for the attack in the first stage can be obtained as the acid coming from the result of the second stage, the process thus being performed in a countercurrent manner. By weak acid we mean an acid solution having a concentration of 50 to 200 g./l. When a single pretreatment stage is used the weak acid solution normally contains 150 to 200 g./l. and when a two stage pretreatment is used the first stage acid concentration is normally 50 to 170 g./l. and the second stage is normally 130 to 200 g./l. An object of the present invention is to achieve maximum recovery of copper without danger of releasing harmful gases. According to the invention, the acid solution resulting from the treatment of the residues and later partial neutralization, which contains a high percentage of copper in solution, with respect to the original content in the residues and in the neutralizing agent, is treated with lead calcine to achieve binding of the copper.

Making the attack of the residues in two stages, as has been pointed out above, presents various advantages, including the reduction of consumption of new acid. At the same time, there is the possibility of dissolving the ZnS present in the residue, as a result of insufficient roasting of the concentrate. A better attack on the ferrites is also achieved.

Another advantage that derives from attack in two or more stages is a more concentrated lead-silver product results. Finally, there should be pointed out as an advantage of this invention, a lead-silver product having decanting and filtering characteristics which are usually superior to those of the product that is obtained if the attack is performed in only one stage.

Another advantage of using lead calcine for binding the copper, there should be pointed out the maximum recovery of this metal and the safety of the process, since there is no danger of releasing harmful gases.

What is claimed is:

1. In a process for recovering zinc values from the residue of a neutral leach of zinc calcine, said residue containing zinc ferrite and heavier metals, while maintaining atmospheric pressure and a temperature of about 90° to 95° C., which comprises:
    a. treating said residue with a solution having an $H_2SO_4$ concentration of about 180 to 200 g./l., decanting to separate the undissolved residue, the resulting solution having an $H_2SO_4$ concentrate of greater than 10 g./l.;
    b. treating the undissolved residue with a solution having an $H_2SO_4$ concentration of at least 300 g./l. to obtain a resulting solution containing zinc sulphate and iron sulphate, said resulting solution having a sulfuric acid concentration of 180 to 200 g./l.;
    c. separating undissolved residue from said resultant solution (b); and
    d. recycling said solution to step (a); the improvement consisting of (i) adding $Na^+$, $K^+$ or $NH_4^+$ ions to said resultant solution (a); (ii) neutralizing solution (i) in a first step with zinc oxide or other appropriate zinc-containing agent until its acidity is 10 to 100 g./l of $H_2SO_4$, so that some of the iron contained in the solution separates therefrom in the form of complex basic sulphate solids, said solids containing 1 to 3 percent by weight Zn,; (iii) settling said solids and separating said solids by filtering; (iv) neutralizing the solids-free solution resulting from step (iii) in a second step with zinc oxide or another neutralizing agent containing zinc until its acidity is 2 to 10 g./l. of $H_2SO_4$, so that the iron remaining in said solution separates therefrom in the form of complex basic sulphate solids; (v) settling the solids, whereby a solution (V) with an Fe content of 1 to 3 g./l. results; a temperature of 50° C. to the boiling point of the solution being maintained throughout the process, and any $Fe^{++}$ existing or forming during the process being oxidized by $MnO_2$ or air.

2. The process of claim 1 wherein said solution (V) is recycled to said neutral leach of zinc calcine.

3. The process of claim 1 wherein said soltution (V) in used in a conventional electrolytic zinc plant.

4. The process comprised of: dissolving the zinc oxide and ferrites contained in zinc calcine in a first stage with strong $H_2SO_4$ solution formed from spent electrolyte and, as required, concentrated $H_2SO_4$, at a temperature of 50° C. to the boiling point of the solution, until an acidity of 10 to 100 g./l. of $H_2SO_4$ is reached, in the presence of $Na^+$, $K^+$ or $NH_4^+$ ions, any $Fe^{++}$ existing in the solution being oxidized by $MnO_2$ or air, whereby some of the iron precipitates in as a solid complex basic sulphate, said solids containing 1 to 3 percent by weight Zn, said sulphate and the undissolved residue are separated by settling and filtering, said residue containing Fe, Pb and Ag; the resultant solids-free solution is gradually neutralized in a second stage with calcine until its pH is 5 to 5.5, at a temperature of 50° C. to the boiling point of the solution, any $Fe^{++}$ present being oxidized with $MnO_2$ or air, precipitating the Fe out as a solid complex basic sulphate and $Fe(OH)_3$; separating said precipitate by settling and sending said precipitate to the first stage to dissolve out zinc oxide and zinc, copper and cadmium ferrites present in said precipitate, while the complex basic sulphate in said precipitate remains unchanged and serves for crystal seeding to make easier the separation of the iron present in the solution in its complex basic sulphate form.

* * * * *